June 1, 1965     H. H. CHARLES     3,186,128
HYPERBOLIC PARABOLOIDAL CONSTRUCTION
Filed May 18, 1960     5 Sheets-Sheet 1
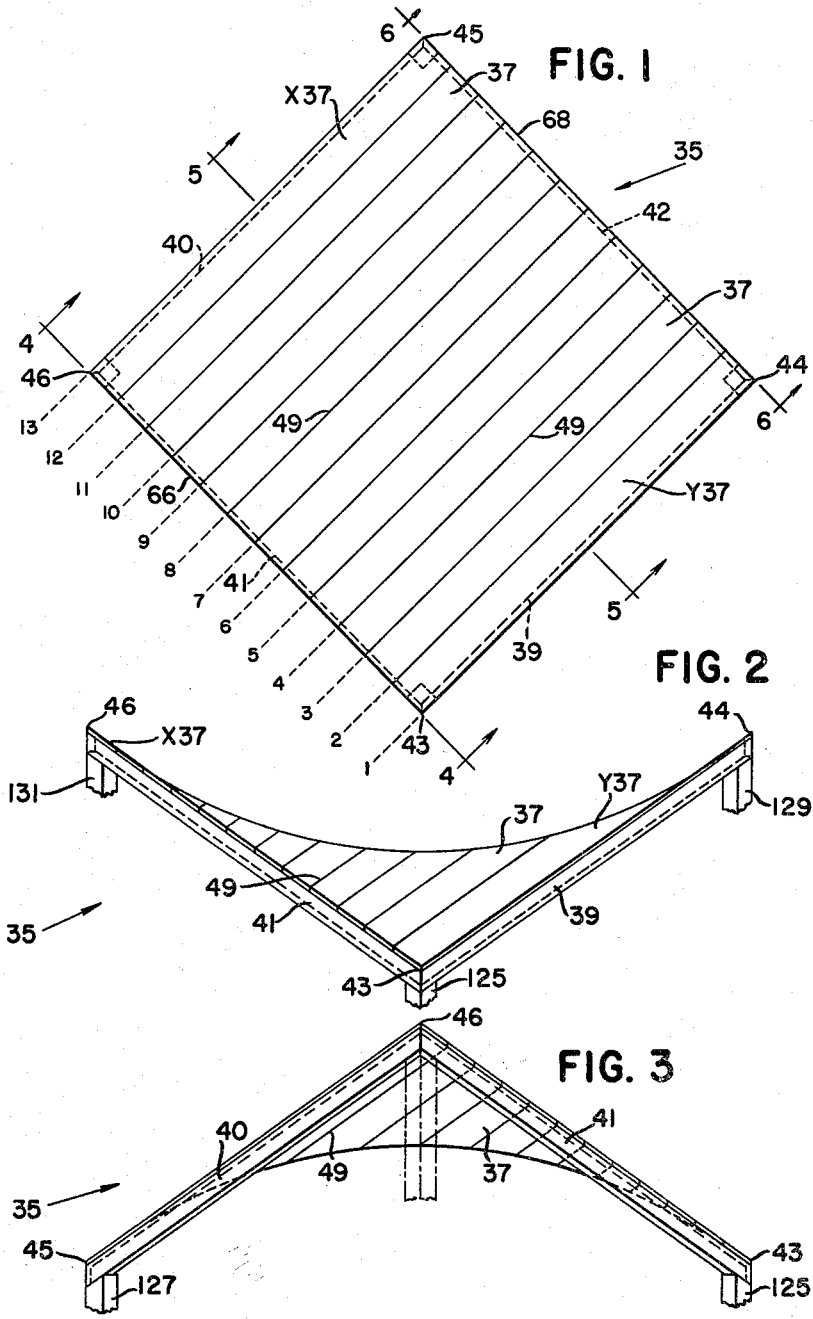
INVENTOR
HAROLD H. CHARLES
BY *Glenn & Jackson*
HIS ATTORNEYS

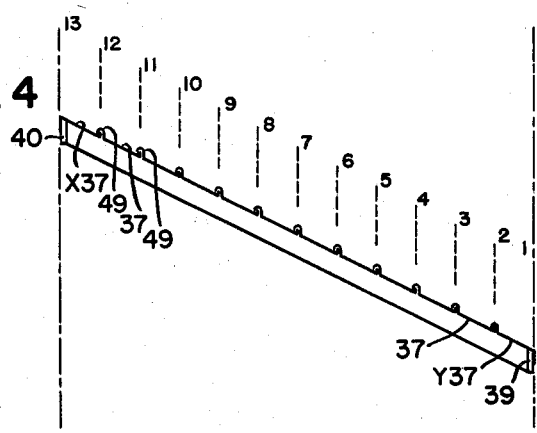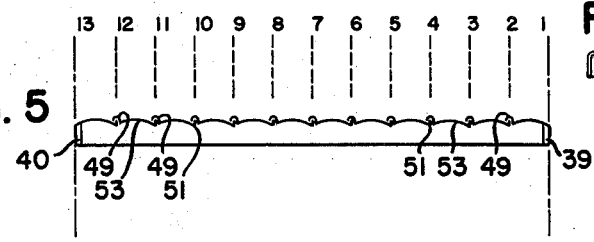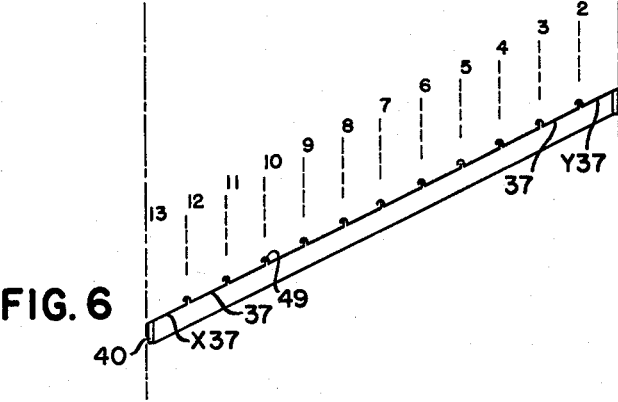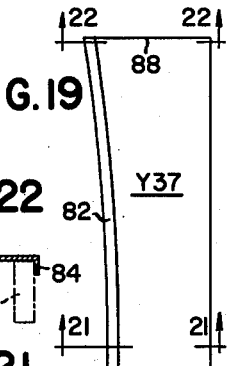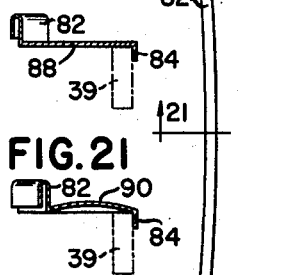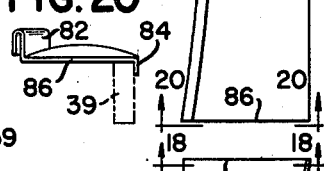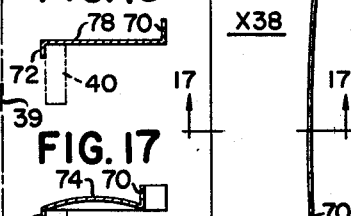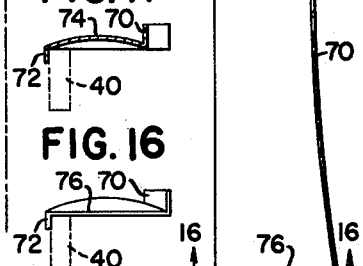

June 1, 1965 H. H. CHARLES 3,186,128
HYPERBOLIC PARABOLOIDAL CONSTRUCTION
Filed May 18, 1960 5 Sheets-Sheet 3

INVENTOR
HAROLD H. CHARLES

BY

HIS ATTORNEYS

June 1, 1965  H. H. CHARLES  3,186,128
HYPERBOLIC PARABOLOIDAL CONSTRUCTION
Filed May 18, 1960  5 Sheets-Sheet 4
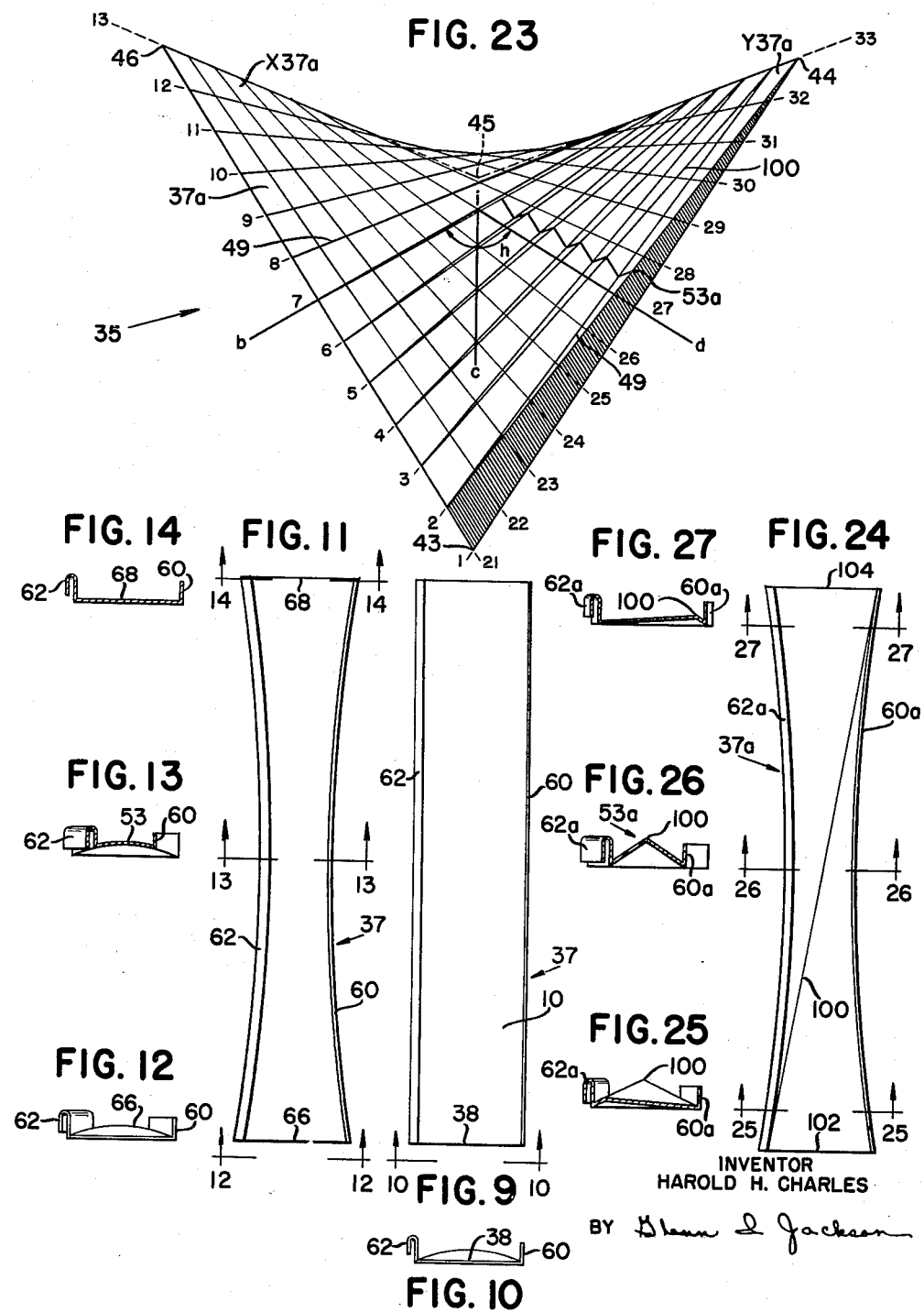
INVENTOR
HAROLD H. CHARLES
BY Glenn L. Jackson
HIS ATTORNEYS June 1, 1965    H. H. CHARLES    3,186,128
HYPERBOLIC PARABOLOIDAL CONSTRUCTION
Filed May 18, 1960    5 Sheets-Sheet 5
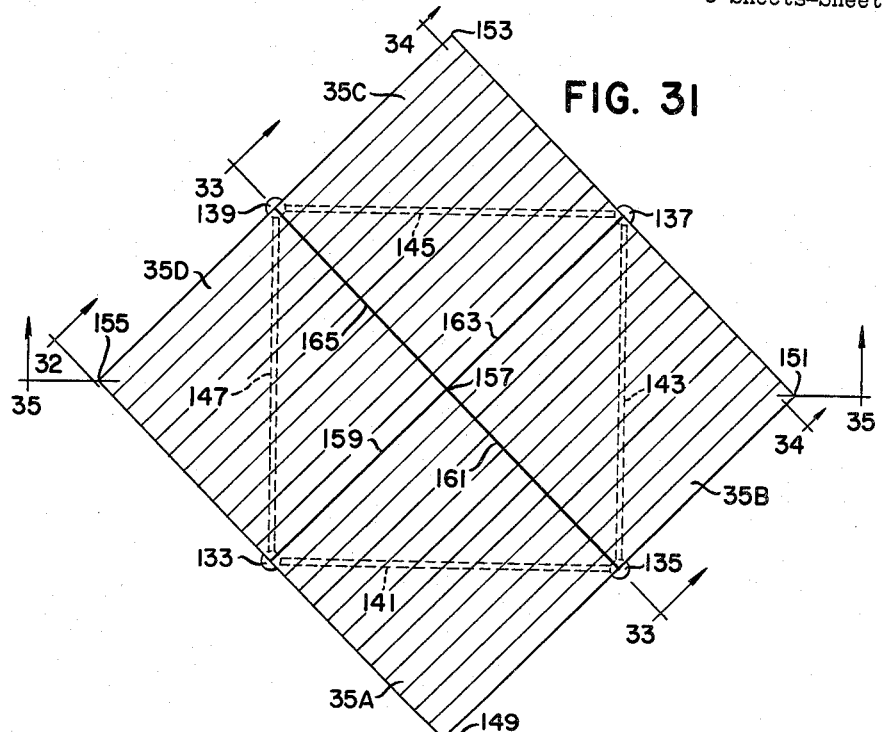
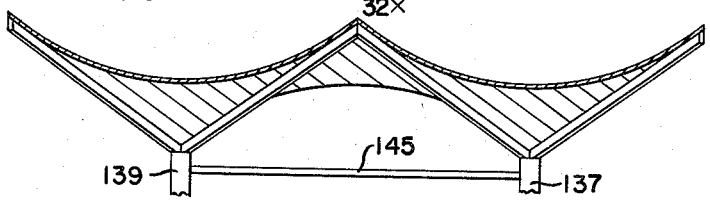
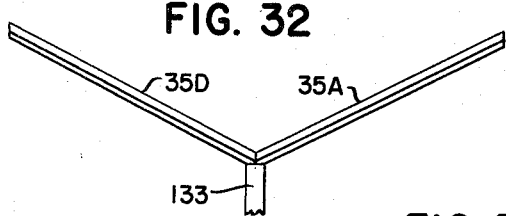
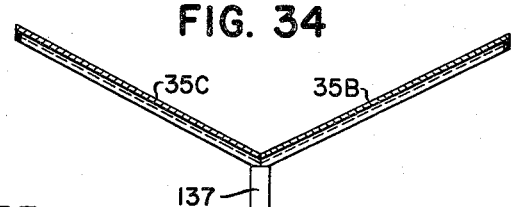
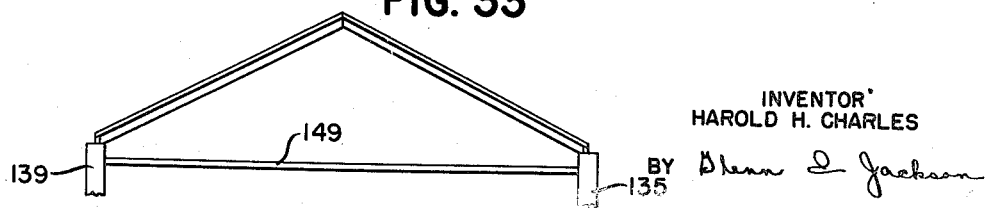
INVENTOR:
HAROLD H. CHARLES
BY
HIS ATTORNEYS

United States Patent Office 3,186,128
Patented June 1, 1965

3,186,128
HYPERBOLIC PARABOLOIDAL CONSTRUCTION
Harold H. Charles, Richmond, Va., assignor to Reynolds Metals Company, Richmond, Va., a corporation of Delaware
Filed May 18, 1960, Ser. No. 29,829
8 Claims. (Cl. 50—52)

This invention relates to an improved generally hyperbolic paraboloidal construction, such as a roof, and also to the method of forming the same.

Heretofore generally hyperbolic paraboloidal constructions or roofs have been made. However, such constructions have been relatively difficult and expensive to erect. The shape of such constructions, and the parts forming the same are not adaptable to be preformed in convenient shapes and sizes to permit such parts to be easily transported or carried to the place of use and there be erected.

According to this invention, a plurality of somewhat similar, longitudinal, sheet metal panels are formed in such a manner and size that they may be easily transported or carried to the place of use and may be attached to each other edge to edge with weather proof, substantially straight linear joints. Preferably, the bases of such joints form or establish the hyperbolic paraboloidal general surface of the construction or roof.

These panels may be somewhat flexible, and preferably a relatively large majority of them are of standard size and shape. They are relatively small compared to a complete unit of a hyperbolic paraboloidal roof. They may be stacked and/or boxed, if desired, for easy transportation to the place of use.

The panels may be serially installed on side supporting members where they mutually fortify each other as they are serially secured to each other by straight linear joints.

The panels are initially slightly flexible and become correctly undulated between their ends and edges to produce a generally hyperbolic paraboloidal surface with straight line joints. The undulations in the panels compensate for the gradual approach of the edges or joints of each panel toward each other from the ends of the panels to the longitudinal center of each panel, in order to produce the desired generally hyperbolic paraboloidal construction.

The joints so produced are weather proof, and straight linear joints. Because of this they are easily assembled. In addition, if desired, they may be temporarily supported by temporary straight beams and the like which may extend between opposite side supporting members while the joints are being assembled and secured together.

The main bodies of the panels are sufficiently flexible while being assembled to adjust themselves to the particular undulation an bend required for each individual panel.

If desired, there may be two outside special panels, which usually have one edge each secured to opopsite side supporting members. These two panels may be specially shaped for these positions.

The panel constructions of this invention may alternatively be formed at the site of installation, if desired, by the use of a relatively small number of tools to form the required joints and undulations.

Accordingly, an object of this invention is to provide a hyperbolic paraboloidal construction or roof having one or more of the novel features herein disclosed.

Another object of this invention is to provide novel components for the production of a hyperbolic paraboloidal construction or roof as herein disclosed.

Another object of this invention is to provide a method of assembling or erecting a hyperbolic paraboloidal construction or roof having one or more of the novel features herein disclosed.

Other objects of this invention are apparent from this description and/or the accompanying drawings in which:

FIGURE 1 is a diagrammatic plan view of a complete unit for a construction or roof according to this invention, with joint and edge details omitted.

FIGURE 2 is a diagrammatic front elevation of FIGURE 1, with joint and edge details omitted.

FIGURE 3 is a diagrammatic side elevation of FIGURE 2, taken from the left side of FIGURE 2, with joint and edge details omitted.

FIGURE 4 is a diagrammatic single line contour of the panel and joint construction taken along line 4—4 of FIGURE 1.

FIGURE 5 is a view similar to FIGURE 4, but taken along line 5—5 of FIGURE 1.

FIGURE 6 is a view similar to FIGURE 4, but taken along line 6—6 of FIGURE 1.

FIGURE 9 is a plan view of a panel for use in the roof construction in flat condition, with joint flanges, and without any compensating undulation in the panel, the panel being shown relatively shorter than is ordinarily used.

FIGURE 10 is an elevation of the end of FIGURE 9.

FIGURE 11 is a plan view of a regular panel of the type shown in FIGURES 9 and 10, with an arch shaped undulation, preformed, if desired, to provide the necessary divergence of the joints from the center to the ends of the panel, and with the undulation and divergence exaggerated for better showing.

FIGURE 12 is an elevation of the end of the panel taken from line 12—12 of FIGURE 11.

FIGURES 13 and 14 are cross-sections along lines 13—13 and 14—14, of FIGURE 11, respectively.

FIGURE 15 is a view similar to FIGURE 11, but showing a first special panel one edge of which is to be attached to a side supporting member.

FIGURES 16, 17 and 18 are elevations or cross-sections and taken along the lines 16—16, 17—17 and 18—18 of FIGURE 15.

FIGURE 19 is a view similar to FIGURE 15, but showing a second special panel one edge of which is to be attached to the opposite side supporting member.

FIGURES 20, 21 and 22 are elevations or cross-sections taken along the lines 20—20, 21—21 and 22—22 of FIGURE 19.

FIGURE 23 is an orthographic projection of a hyperbolic paraboloidal unit suitable as a complete roof, or as a component to be used with similar units for a larger roof, and with undulations of another embodiment.

FIGURE 24 is a plan view similar to FIGURE 11, but showing another embodiment of an undulation, such as is illustrated in FIGURE 23.

FIGURES 25, 26 and 27 are elevations or cross-sections along the lines 25—25, 26—26 and 27—27 of FIGURE 24.

Figure 28:
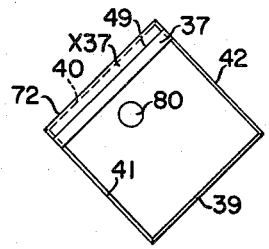
Figure 29:
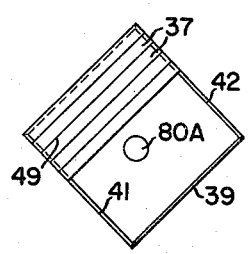
Figure 30:
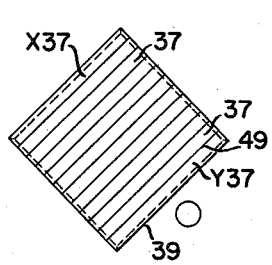

FIGURES 28, 29 and 30 are diagrammatic plan views on reduced scale of progressive stages of completion of the units shown in FIGURES 1 and 23.

FIGURE 31 is a diagrammatic plan view of an assembly of a plurality of hyperbolic paraboloidal units to form a composite roof.

FIGURES 32-34 are diagrammatic cross-sections along lines 32—32, 33—33 and 34—34 of FIGURE 31 with background and joints omitted.

FIGURE 35 is a diagrammatic cross-section along line 35—35 of FIGURE 31 with joints omitted and with some background included.

The hyperbolic paraboloidal general surface of a construction or roof according to this invention may have a general surface which follows in general a hyperbolic paraboloidal design but in which individual panels undulate from such general surface to permit the panels to be separately erected, and to be prefabricated, if desired, with easy and economical transportation to the site. The hyperbolic paraboloidal general surface of the construction or roof of this invention may have two systems of straight lines, such as 1–13 and 21–33 respectively of FIGURE 23. The lines 1–13 of one system are parallel to the director plane b i c, and the lines 21–33 of the other systems of straight lines are parallel to the director plane c i d. The director planes intersect at an angle $h$, which may be a right angle, if desired. The intersections of the lines 1–13 of one system with the lines 21–33 of the other system establish the general hyperbolic paraboloidal surface of this invention. While 13 lines have been indicated for each system in FIGURE 23, it is obvious that there may be an infinitesimal member of lines in each system, which have not been illustrated, and the intersections of which establish the theoretical hyperbolic paraboloidal surface.

A construction or roof of this invention has a hyperbolic paraboloidal general surface which preferably is established by the bases of the points 49 between adjacent longitudinal panels 37, 37a, etc. The actual surface of the roof, however, undulates from such general surface for purposes which become apparent from this disclosure. The joints 49 occur at the lines 2–12, and the bases 51 of such joints establish the hyperbolic paraboloidal general surface of the roof construction.

The bases 51 of the joints of the construction or roof of this invention may lie and establish the general or theoretical hyperbolic paraboloidal surface of the construction of this invention. The remainder of the actual surfaces of this invention, which are formed by the main bodies of the panels, undulate from such general or theoretical surface, as more fully herein explained.

One embodiment of a hyperbolic paraboloidal unit 35 of this invention is shown in plan view in FIGURE 1, and in side elevation in FIGURES 2 and 3. Another slightly different embodiment of a unit 35 is shown in orthographic projection in FIGURE 23. Such a unit may comprise a plurality of sheet metal panels 37, X37 and Y37, in FIGURES 1–3, and 37a, X37a and Y37a in FIGURE 23, and a plurality of opposed pairs, such as 39, 40 two pairs of oppositely inclined side supporting members and 41, 42, of intersecting side supporting members to which the panels 37 and 37a, etc., may be attached. The 39–42 intersect at corners 43, 44, 45 and 46. Corners 43 and 45 lie in one plane and may be the "low" corners, and 44 and 46 may lie in another plane and may be the "high" corners.

For the sake of brevity, such terms or adjectives as "low," "high," "vertical," "horizontal," etc., are used herein for convenience in connection with the specific illustrations shown in the drawings. However, it is understood that the parts described and/or shown with such directional terms or adjectives may actually be used in other directions, so that the above quoted terms and adjectives are used as exemplary terms only, and not by way of limitation.

The panels 37, etc., of FIGURES 1, 2, and 3 are later described as having curvingly arched undulations, while the panels 37a, etc., of FIGURE 23 are later described as having straight line arched undulations, these undulations forming two embodiments of this invention. However, many of the descriptions and illustrations in connection with FIGURES 1, 2, and 3 are applicable to FIGURE 23, and vice versa, as is obvious, and such descriptions and illustrations are intended to be interchangeable wherever possible without unnecessary repetition.

The panels 37 and 37a, etc., may be made of sheet metal, such as aluminum containing sheet made of commercial aluminum, and/or any suitable alloy thereof. Merely by way of illustration, and not by way of limitation, the following examples of dimensions, etc., are given. The side supporting members 39–42 may be substantially 8 feet, 11¾ inches long with 12 panels 37 or 37a, etc., attached thereto. The panels may be made of a sheet of 0.025 thickness and of aluminum or a suitable aluminum alloy. The joints 49 may extend transversely to the panels a distance of ⅞ inch upwardly. The corners 44 and 46 may be raised 4 feet above the corners 43 and 45. However, these dimensions may be varied widely, as is obvious, since they are given merely by way of example.

The joints 49, etc., attach the panels 37 or 37a, etc., edge to edge, with weather proof construction. The joints 49, etc., are substantially straight linear joints with their bases 51, etc., FIGURE 7, coinciding with straight lines 1–13 and forming or establishing the hyperbolic paraboloidal general surface of the construction or roof of this invention.

The main bodies of the panels 37 and 37a, between the joints 51 may have undulations 53 and 53a, etc., as in FIGURES 13 and 26, between the joints 51, to compensate for the gradual approach of the joints toward each other from the ends of the panels to the longitudinal center of the panels. In the size of unit previously described, with 12 panels, such panels may have their joints approximately one inch closer at the longitudinal center than at the ends. This difference will vary with other sizes, etc., of units.

The two outside special panels X37 and Y37 (and X37a and Y37a) which are attached to the side supporting members 39 and 40 may have special attaching joints and undulations to permit them to be attached to such side supporting members while maintaining the hyperbolic paraboloid. These special panels are illustrated in FIGURES 15–22 in the case of panels X37 and Y37, which are later more fully described. These illustrations make the similar constructions of panels X37a and Y37a self explanatory.

According to this invention the bases 51 of the joints 49, and the edge joints at the supports 39 and 40 lie in straight lines 1–13. (There may be a smaller or larger number of such straight lines, joints and panels, if desired.) As is apparent from FIGURES 4–6, these lines 1–13, and the corresponding joints gradually converge, closer together as they approach the longitudinal centers of panels (FIGURE 5) and gradually diverge away from each other as they approach the ends of the panels (FIGURES 4 and 6). Hence, the distance between the joints 49 as measured along FIGURES 4 and 6 is greater than the distance between such joints 49 as measured along FIGURE 5, or as measured along any other cross-section which might be taken parallel to FIGURE 5 between FIGURE 5 and FIGURES 4 or 6.

According to this invention, the panels 37, 37a, X37, etc., preferably are made of sheet metal, such as aluminum or aluminum alloy sheet of suitable strength, thickness, temper, etc. These panels may be preformed, if desired, from flat rectangular sheets of such material in such a manner that the preformed panels may be easily transferred to the place of use and there be assembled into a relatively strong and economical hyperbolic paraboloidal unit. Alternatively such flat rectangular sheets may be completely formed at the place of use with a relatively small number of proper tools, as is evident.

Referring particularly to FIGURES 9 to 14 which show one form of regular panel, a rectangular metal sheet may be initially formed as shown in FIGURES 9 and 10 into a flat, flanged panel 37. For example, one side of the sheet may be provided with a joint formation, such as an upward joint forming flange 60 and the other side of the sheet may have a joint formation which may be formed with a reversely bent flange 62 which is adapted to dovetail with the flange 60 of an adjacent panel to form a joint 49. Such dovetailed joint 49 may be made secure by a series of fastening devices 64, FIGURE 7, of any suitable character, such as screws, cold welds, crimps, etc., which are adapted to secure together the dovetailed flanges 60 and 62 in any sufficiently effective manner. The main body 38, FIGURE 10, of the panel between the joints 60 and 62 may be preliminarily flat, as shown in FIGURES 9 and 10, and is suitable to form panels 37 and 37a.

In order to compensate for the gradually changing distance between the flanges 60 and 62 of any panel 37, 37a, etc., as illustrated in FIGURES 4–6, the main body 38, FIGURE 10, of the panel 37 (37a, etc.), may be given a preliminary undulation which will automatically take the form of the gradually varying undulation 53, shown in FIGURES 11 to 14, when such panel is installed on the hyperbolic paraboloidal surface. For example, the intermediate or regular ten panels 37 (more or less) shown in FIGURES 1, 2, and 3, may be given an initial form such as shown in FIGURES 9 and 10, and may then be given an intermediate undulated form which readily adapts itself to the packing or stacking of the ten panels 37, so they may be taken to the place of use, and such preliminary intermediate undulation is then adapted automatically to yield during installation to form a final undulation so the panels may be assembled together to form the hyperbolic paraboloidal unit shown in FIGURES 1, 2, and 3.

When completely installed on the unit, the panels 37 will yieldingly take the form shown in FIGURES 11 to 14 without the exaggerated proportions shown in these FIGURES 11 to 14, which are exaggerated more readily to show the principles involved. At the ends 66 and 68, the main body of the panels 37 may be substantially flat, as indicated in FIGURES 12 and 14. Adjacent the longitudinal center of the panels 37, the main body of the panel may take an undulation 53, which in this particular embodiment is curvingly arch-shaped, with gradually increasing height from the ends 66 and 68 to the longitudinal center, as shown in FIGURE 13. The initial preliminary or intermediate undulation which may be produced in the panel 37 before installation, is sufficiently close to the final form, so that the panel automatically takes its final form as it is installed and secured to adjacent panels, and to the side supporting members, when they are used. The various panels 37, etc., of the construction are given a slight twist, not shown in FIGURES 11–14, when the edges 66 and 68 are secured to the oppositely slanting side supporting members 41 and 42.

The first special panel X37 of FIGURES 1, 2, 3 is shown in greater detail in FIGURES 15 to 18. Such panel X37 may be formed from a substantially flat, rectangular sheet and may be formed with a joint formation such as an upward longitudinally curved flange 70 on one side and a downward straight flange 72 on the other side, as indicated in FIGURES 16 to 18. In addition, the main body X38 of the panel X37 may be given an initial preliminary or intermediate undulation so that when it is installed with its downward flange 72 against the side supporting member 40, and with the ends 76 and 78 secured to the side supporting members 41 and 42, the upwardly directed flange 70 is adapted to receive the reversely bent flange 62 of the leftmost panel 37 shown in FIGURES 1, 2, and 3. The undulation produced in panel X37 is such that it automatically asumes a final undulation with its maximum height at 74, FIGURE 17, which height gradually diminishes and may become flat at the ends 76 and 78. The upward flange 70 becomes slightly inwardly curved, as shown in FIGURE 15 to dovetail with the reversely bent flange 62 of the leftmost panel 37. The panel X37 is given a slight twist, not shown in FIGURES 15–18, when the ends 76 and 78 are attached to the oppositely slanting side supporting members 41 and 42, as is evident from FIGURES 4 and 6.

The second special panel Y37 may be made from a rectangular metal sheet, substantially in the same manner as panel X37, previously described, but in "mirror" form. An initial undulation may be preformed in the panel Y37, so that, in final assembly, the undulation 90 is formed automatically with the final installing steps of the panel Y37. The panel Y37 has ends 86, 88, curved reversely bent upward joint formation or flange 82, straight downward flange 84. It is similarly twisted by the oppositely slanting supporting members 41 and 42.

This initial assembly of the first special panel X37 and the leftmost regular panel 37 is diagrammatically indicated in FIGURE 28 where the installing operator may be located, for example, at 80, as well as at any other necessary places, so the panel X37 may be secured at its ends 76, 78 to the opposed side supporting members 41 and 42, and may have its downward flange 72 secured to the side supporting member 40. Thereafter the leftmost panel 37 may be installed by interlocking its reversely bent flange 62 over the upward flange 70 of panel X37. The ends 66 and 68 of leftmost panel 37 may be secured to the oppositely slanting side supporting members 41 and 42 and the interlocked flanges 70 and 62 between panels X37 and 37 may be secured together by any of the securing means heretofore described.

This procedure which is shown in FIGURE 28 automatically causes these two panels X37 and 37 to assume their proper undulated shape, because the joints at 72 and 49 are straight bands, but the main bodies of the panels are twisted by the oppositely slanting side supporting members 41 and 42, as will be readily apparent from FIGURES 4, 5, and 6.

The remaining nine regular panels 37 (more or less) may then be serially installed, as indicated in FIGURES 29 and 30. For example, the second panel 37 may then be installed by placing its reversely bent flange 62 over the already installed flange 60 of the first or leftmost panel 37 which was installed as shown in FIGURE 28. The ends 66 and 68 of the second panel 37 may be secured to the oppositely slanting side supporting members 41 and 42 and the joint 49 between the second and third panels 37 may be secured together at proper times, so that the main bodies of these panels assume the correct undulations to maintain the straight bases 51, FIGURE 7, of the joints 49 in the general hyperbolic paraboloidal contour heretofore defined. After the second panel 37 is secured and attached to the side members 41 and 42 and the intermediate joint 49 is secured, the third, fourth, etc. regular panels 37 may be serially and similarly installed with the installer moving to the gradually changing position 80A and any other positions desired.

After the last regular panel 37 has been installed, as indicated in FIGURE 30, then the second special panel Y37 may be installed with its reversely bent and slightly curved flange 82, FIGURES 19 to 22, placed over the upward flange 60 of the last panel 37. The downwardly directed straight flange 84 of panel Y37 may be secured to the side supporting member 39. The last joint 49, FIGURE 30, may then be secured together in a manner previously described. The flange 84 may be secured to the side supporting member 39. The ends 86 and 88 of panel Y37 may be secured to the side supporting members 41 and 42 to complete the unit shown at FIGURES 1, 2, 3, and 30.

The procedure outlined with respect to FIGURES 28, 29, and 30 is made possible by this invention, because the bases of the joints 49 and the securements at the side supporting members 39–42 all lie in straight lines 1–13 and 21–33, FIGURE 23, which the undulations 53, 74 and 90, of panels 37, X37 and Y37 permit to be made by the relatively simple and more or less uniform shape of such panels 37, X37 and Y37, as is readily apparent.

Another embodiment is shown in FIGURES 23 to 27, in which the panels 37a, X37a, and Y37a have straight line arched undulations instead of the curvingly arched undulations which have been previously described in connection with FIGURES 1 to 22.

The straight lined arched undulations of the panels of FIGURES 23–27, are each formed by a ridge 100 which extends, for example, from the end 102, FIGURE 24, at one side thereof, diagonally to the other end 104 at the other side. The ridge 100 may disappear completely at the end 102, where the edge of the main body of the panel may be substantially straight. The ridge 100 may gradually increase in height to the point 53a, FIGURE 26, substantially at the longitudinal center of the panel 37a and may then gradually diminish in height until it may also disappear at the end 104. This increasing height of the ridge 100 toward the longitudinal center of panel 37a causes the side flanges 60a and 62a gradually to move inward toward the longitudinal center of the panel 37a, substantially in the same manner as with respect to the flanges 60 and 62 of panels 37. The construction is such that the panels 37a, X37a and Y37a of FIGURES 23–27 may be assembled substantially in the same manner as has been previously described in connection with panels 37, X37 and Y37 of FIGURES 28, 29 and 30. The first and second special panels X37a and Y37a, indicated in FIGURE 23, may be the same as panels X37 and Y37, shown in FIGURES 15 to 22, except that the undulation may be produced by a diagonal straight line ridge, similar to ridge 100, in a manner to produce such special panels X37a and Y37a for securement to the side supporting members 40 and 39 respectively. It is believed unnecessary to illustrate or further describe such special panels X37a and Y37a, since their construction and mode of assembly is apparent from the previous description concerning panels X37 and Y37. Likewise, the regular panels 37a may be assembled substantially in the same manner as panels 37 previously described. The procedure of FIGURES 28, 29, and 30 is applicable to FIGURES 23–27 and is evident from the previous description with respect to panels 37, X37, and Y37, so that any further description and illustration are believed to be unnecessary.

Figure 7:
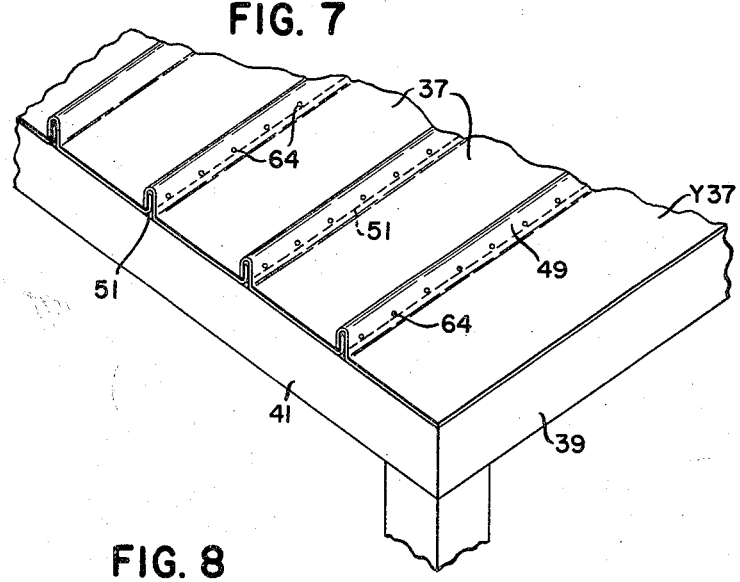
FIGURE 7 is a perspective view of the front corner of FIGURE 1 and showing on enlarged scale the panel and joint construction with a flush edge construction over the side supporting members.
Figure 8:
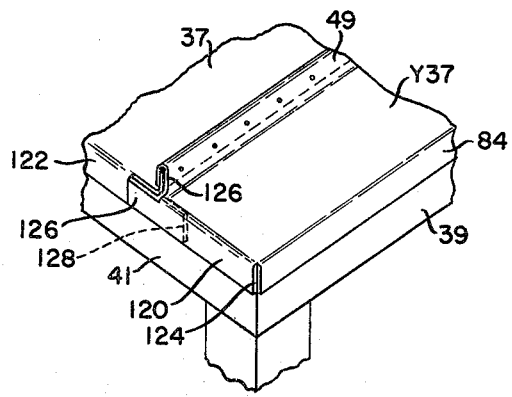
FIGURE 8 is a view similar to part of FIGURE 7, but showing a downward flange edge construction over the side supporting members.

Referring now to FIGURES 7 and 8, the panels heretofore described, may terminate at the outer top edges of the side supporting members 39 to 42 as indicated in FIGURE 7 without downward flanges, or they may extend downwardly to form flanges such as 72 and 84 over the side supporting members 39 and 40, and end flanges 120 and 122, FIGURE 8, which may extend over the side supporting members 41 and 42.

In FIGURE 7, the edges of the panels 37, X37 and Y37 may be sealed in any well known manner or by caulking, etc. The ends of the joints 49 likewise may be sealed by caulking, soldering, etc. If desired, the sides and ends of the panels 37, etc., may be extended slightly beyond the side supporting members 39–42 (and slightly bent down if desired) to permit the water from the roof to drip or drain off to the ground or into a gutter which may be secured to the sides of members 39–42.

In the embodiment of FIGURE 8, the sides of the flanges 84, 120, and 122 and the flange 72 which is not illustrated in FIGURE 8, may be secured to the side of the side supporting members 39–42. If the fastening devices extend through the surfaces of the panels, the holes produced may be caulked or otherwise sealed as desired. The joint 124 may be a lap or butt joint and may be properly sealed. The vertical joints 49 may, if desired, be terminated by cutting or the like at 126 to permit the bending and formation of the flanges 120 and 122. The cut portions of the joints 49 at the ends of the panels may be straightened out so that the reverse joints 62, 62a, 82, etc., of the cut portions may be straightened to extend to form an outer overlapping joint 126 which covers the straightened out portion 128 of the cut portions of flanges 60, 60a, etc. All exposed joints may be sealed by caulking, soldering, etc., as previously described. If desired, guttering may be secured to the sides of members 39–42 with the flanges 72, 84, 120 and 122 overlapping the inner side of the gutter.

Any of the hyperbolic paraboloid units 35 disclosed in connection with FIGURES 1–30 may be used as a complete roof. For example, the "low" corners 43 and 45 may be supported on compression columns or supports 125 and 127 on which the entire weight of the unit 35 may rest. Such columns may be made laterally rigid against any expected lateral thrusts, such as from wind, uneven snow loads, etc. The "high" corners 44 and 46 may also have columns, wires, or the like 129, 131 which may be compression or tension members, depending on the particular circumstances of loading, wind thrusts, side thrusts, etc. The columns 125, 127, 129, and 131 may also be used as frame members for enclosing side wall constructions, if desired.

Two or more of any of the units 35 may be assembled into a composite construction, such as the composite roof shown in FIGURES 31–35 which is made of units 35A, 35B, 35C, and 35D which are assembled edge to edge as is apparent from FIGURE 31.

The composite "low" corners of the roof may be supported on columns or supports 133, 135, 137, and 139 which preferably are made laterally rigid by their own construction to the desired extent. In addition they may be made laterally rigid by tie rods 141, 143, 145, 147 which are shown in dotted lines in FIGURE 31 and which extend between the upper portions of columns 133, 135, 137, and 139. In addition a tie rod 149 may extend between the upper portions of the columns 139 and 135, and a similar tie rod, not shown, may extend between columns 133 and 137.

The composite outer "high" corners 149, 151, 153 and 155 may have lesser compression and/or tension columns, wires, etc., extending to the ground, not shown, but similar in function to columns, wires or the like 129, 131 of FIGURES 1–3, which also may be used as frame members for enclosing side wall constructions, if desired.

The composite "high" corner or center 157 may or may not have a column support as desired.

The composite side supporting members 159, 161, 163 and 165 may be made by securing together individual supporting side members of units 35A, 35B, 35C and 35D, or such composite supporting members may be single members serving doubly as side supporting members for such units.

The panels 37, 37a, etc., as the case may be, may all extend in the same direction on all units 35A to 35D. Alternatively such panels may be parallel in each unit, and extend in directions different from the direction of panels on other units.

If desired, the panels 37, 37a, etc., may be made double length and may extend completely across two units. For example, the panels 37, 37a, etc., of unit 35A and 35B may be double length panels extending completely across such units 35A and 35B. Likewise, the panels of units 35C and 35D may have composite double length panels. Alternatively, the same arrangement may be made at right angles in which double length panels extend across units 35A and 35D and across units 35B and 35C, as desired.

The units 35 may be combined in any other desired composite construction or roof, as desired.

By this invention, a construction is provided wherein relatively small panels of more or less uniform construction may be made and installed, with preforming either at the site of use, or at a more or less distant manufacturing site, so that the hyperbolic paraboloidal construction of this invention may be made in a relatively simple, efficient and economical manner.

One final, but important, feature of this invention is that by forming the panels with curved undulations, such as is shown at 53 in FIG. 13 and at 90 in FIG. 21 or with arched undulations such as the ridge 100 in FIGS. 24–26, the panels become sufficiently flexible to accommodate dimensional changes caused by exposure to varying temperatures or the like.

While the form of invention now preferred has been disclosed in accordance with the requirements of the statute, other forms may be used, all coming within the scope of the claims which follow.

What is claimed is:

1. A method of erecting a roof having two pairs of oppositely slanting side supporting members intersecting at two diagonally opposed corners in one plane and two diagonally opposed corners in another plane and having a hyperbolic paraboloidal general surface structure supported by said side supporting members, which method comprises: forming a plurality of relatively long and relatively narrow regular panels each with their side edges having joint formations adapted to mate with the joint formations of other adjacent panels, and preforming a longitudinal undulation in said panels between said joint formations; forming first and second relatively long and relatively narrow outer special panels each having a side supporting member engaging side edge and a joint formation at the other side edge adapted to mate a joint formation of an adjacent regular panel; securing the side edge of said first special panel to one of said side supporting members and the ends of said first special panel to adjacent opposed side supporting members; serially securing the ends of said regular panels to said adjacent side supporting members with joints formed by said joint formations and with longitudinal undulations in said panels automatically adjusted; and securing the ends of said second special panel to said opposed side supporting members, its joint formation to the joint formation of the last secured regular panel, and its other side edge to the adjacent side supporting member, said panels forming said hyperbolic paraboloidal general surface with said joints lying in straight lines of one of the straight line systems of said hyperbolic paraboloidal general surface.

2. A method according to claim 1 in which said joint formations are formed to provide joints which are interlocked joints with a straight flange on one adjacent panel and a reversely bent flange on the other adjacent panel, said joints being serially interlocked as said panels are serially secured to said opposed side supporting members.

3. The method of erecting a roof having two pairs of oppositely slanting side supporting members intersecting at two diagonally opposed corners in one plane and two diagonally opposed corners in another plane and having a hyperbolic paraboloidal general surface structure supported by said side supporting members which method comprises: forming a plurality of relatively long and relatively narrow regular panels each with their side edges having joint formations adapted to mate with the joint formations of other adjacent panels; forming first and second relatively long and relatively narrow outer special panels each having a side supporting member engaging side edge and a joint formation at the other side edge adapted to mate a joint formation of an adjacent regular panel; securing a side edge of said first special panel to one of said side supporting members and the ends of said first special panel to adjacent opposed side supporting members; serially securing the ends of said regular panels to said adjacent opposed side supporting members with joints formed by said joint formations; and securing the ends of said second special panel to said opposed side supporting members, its joint formation to the joint formation of the last secured regular panel, and its other side edge to the adjacent side supporting member, said panels forming said hyperbolic paraboloidal general surface with said joints lying in straight lines of one of the straight line systems of said hyperbolic paraboloidal general surface, and with longitudinally adjusted undulations automatically formed in said panels.

4. A method according to claim 3 in which the preforming of the undulations provide undulations which are curvingly arched and higher at the longitudinal centers of said panels.

5. The method of erecting a construction having two pairs of oppositely slanting side members intersecting at two diagonally opposed corners in one plane and two diagonally opposed corners in another plane and having a hyperbolic paraboloidal general surface structure secured to said side members which method comprises: forming a plurality of relatively long and relatively narrow regular panels each with their side edges having joint formations adapted to mate with the joint formations of other adjacent panels; forming first and second relatively long and relatively narrow outer special panels each having a side member engaging side edge and a joint formation at the other side edge adapted to mate a joint formation of an adjacent regular panel; securing a side edge of said first special panel to one of said side members and the ends of said first special panel to adjacent opposed side members; serially securing the ends of said regular panels to said adjacent opposed side members with joints formed by said joint formations; and securing the ends of said second special panel to said opposed side members, its joint formation to the joint formation of the last secured regular panel, and its other side edge to the adjacent side member, said panels forming said hyperbolic paraboloidal general surface with said joints lying in straight lines of one of the straight line systems of said hyperbolic paraboloidal general surface, with longitudinally adjusted undulations automatically formed in said panels.

6. A roof supported on two pairs of intersecting opposite side supporting members, said roof having a substantially hyperbolic paraboloidal general surface containing two systems of straight lines, each system being parallel to a different director plane of two director planes which form an angle with each other and in which the intersections of the lines of one of said systems with the lines of the other of said systems establish said general surface of said roof, said roof having a plurality of metal sheet panels with their panel ends secured to one of said pairs of said intersecting side supporting members and with their panel edges forming interlocking joints with the adjacent panel edges of adjacent panels, said joints coinciding with the straight lines of one of said systems of straight lines substantially at the general surface of said roof and said panels being undulated between their ends and edges to compensate for the gradual approach of the edges of each panel toward each other from the ends of each panel to the longitudinal center of each panel, with one of said pairs of intersecting opposite side supporting members including opposite panel end supporting members and the other of said pairs including opposite panel edge supporting members, and with a plurality of said panels being intermediate regular panels intermediate a first special panel and a second special panel, said intermediate regular panels having their ends secured respectively to said panel end supporting members, said first special panel having its ends secured to said panel end supporting members with one of its edges secured to one of said panel edge supporting members and with its other edge secured to and forming one of said joints with one of said intermediate regular panels, said second special panel having its ends secured to said panel and supporting members with one of its edges being secured to the other of said panel edge supporting members and with its other edge secured to and forming one of said joints with another of said intermediate regular panels.

7. A roof according to claim 6 in which said joints are upwardly directed straight weather proof joints.

8. A roof according to claim 7 in which said joints are each straight flange and reversely bent flange joints with a straight flange on one adjacent panel and a reversely bent flange on the other adjacent panel, said reversely bent flange covering said straight flange.

References Cited by the Examiner

UNITED STATES PATENTS

| | | | |
|---|---|---|---|
| 385,408 | 7/88 | Cushman | 50—235 |
| 405,122 | 6/89 | Sagendorph | 50—235 |
| 1,030,590 | 6/12 | Latulip | 50—235 X |
| 2,387,487 | 10/45 | Abeles | 50—235 X |
| 2,434,185 | 1/48 | Whitehouse | 50—217 |
| 2,891,491 | 6/59 | Richter | 50—52 |
| 2,918,151 | 12/59 | Kennedy | 50—52 X |
| 2,962,130 | 11/60 | Marsi | 189—34 |
| 2,984,945 | 5/61 | Campbell | 50—66 X |
| 3,031,044 | 4/62 | Stitt et al. | 189—34 |
| 3,090,162 | 5/63 | Baroni | 50—52 |
| 3,094,812 | 6/63 | Peeler | 50—52 |

OTHER REFERENCES

Architectural Record, March 1949, p. 169.

EARL J. WITMER, *Primary Examiner.*

JACOB L. NACKENOFF, JACOB SHAPIRO,
*Examiners.*